United States Patent
Bank et al.

(10) Patent No.: US 11,254,793 B2
(45) Date of Patent: Feb. 22, 2022

(54) CATALYST-DOPED SIZING AGENT FOR PREPARATION OF HIGH AREAL WEIGHT FIBER SHELF-STABLE PREPREG OR MOLDING COMPOUND INTERMEDIATES

(71) Applicant: Dow Global Technologies LLC, Midland, MI (US)

(72) Inventors: David H. Bank, Midland, MI (US); Richard Baumer, Midland, MI (US); Kevin J. Bouck, Midland, MI (US); Jun Cai, Midland, MI (US); Marsha L. Langhorst, Midland, MI (US); Abhijit A. Namjoshi, Freeport, TX (US); Weijun Wang, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 448 days.

(21) Appl. No.: 16/332,616

(22) PCT Filed: Aug. 30, 2017

(86) PCT No.: PCT/US2017/049240
§ 371 (c)(1),
(2) Date: Mar. 12, 2019

(87) PCT Pub. No.: WO2018/052707
PCT Pub. Date: Mar. 22, 2018

(65) Prior Publication Data
US 2021/0292499 A1    Sep. 23, 2021

Related U.S. Application Data

(60) Provisional application No. 62/393,720, filed on Sep. 13, 2016.

(51) Int. Cl.
| | | |
|---|---|---|
| *C08J 5/24* | (2006.01) | |
| *C08G 59/24* | (2006.01) | |
| *C08G 59/40* | (2006.01) | |
| *C08J 3/24* | (2006.01) | |
| C08L 63/02 | (2006.01) | |
| D06M 13/322 | (2006.01) | |

(52) U.S. Cl.
CPC ............ *C08J 5/248* (2021.05); *C08G 59/245* (2013.01); *C08G 59/4021* (2013.01); *C08J 3/242* (2013.01); *C08J 5/243* (2021.05); *C08J 2363/02* (2013.01); *C08J 2463/02* (2013.01)

(58) Field of Classification Search
None
See application file for complete search history.

(56) References Cited

U.S. PATENT DOCUMENTS

| | | | |
|---|---|---|---|
| 3,390,037 A | 6/1968 | Christie | |
| 3,793,398 A * | 2/1974 | Hokamura | C08L 2666/02 525/65 |
| 2005/0163989 A1* | 7/2005 | O'Byrne | C08J 5/24 428/292.1 |
| 2007/0027274 A1* | 2/2007 | Antelmann | C08G 59/4021 525/523 |
| 2008/0015305 A1* | 1/2008 | Berger | C08J 5/043 524/548 |
| 2010/0068497 A1* | 3/2010 | Harrington | C08J 3/242 428/297.1 |
| 2011/0194942 A1* | 8/2011 | Whiter | B32B 5/26 416/229 R |
| 2012/0328811 A1* | 12/2012 | Patel | C08G 59/50 428/36.9 |
| 2016/0108189 A1 | 4/2016 | Zhang et al. | |
| 2016/0194467 A1* | 7/2016 | Colantonio | B29C 70/48 442/59 |

FOREIGN PATENT DOCUMENTS

| | | | |
|---|---|---|---|
| CN | 104894839 A | 9/2015 | |
| EP | 0791564 A1 | 8/1997 | |
| EP | 0879803 B1 | 9/2002 | |
| EP | 2905302 A1 | 8/2015 | |
| JP | 2011207930 A | 10/2011 | |
| WO | WO-2015015284 A1 * | 2/2015 | ............... C08J 5/06 |

OTHER PUBLICATIONS

Dow Plastics: D.E.R. 383 Product Information (Year: 2000).*
PCT/US2017/049240, International Search Report and Written Opinion dated Jun. 12, 2017.
PCT/US2017/049240, International Preliminary Report on Patentability dated Mar. 28, 2019.
Harper, Modern Plastic Handbook, China Petrochemical Press, p. 705, (2000).

* cited by examiner

*Primary Examiner* — Michael J Feely

(57) ABSTRACT

The present invention provides thermosetting resin pre-impregnated or infused fiber materials or prepregs comprising a thermosetting resin mixture and a fiber material component of a heat resistant fiber, such as carbon fiber, having an areal weight of from 500 to 3,000 g/m2 having a coating of from 0.5 to 4 phr of a latent, particulate curative or solid curative, preferably, dicyandiamide, wherein the prepregs are infused with a thermosetting resin mixture comprising (a) at least one liquid epoxy resin, and (b) a hardener and/or a catalyst, as well as methods of making the same. The prepregs of present invention enables the simple provision of lightweight composites having consistent resin cure throughout.

8 Claims, No Drawings

CATALYST-DOPED SIZING AGENT FOR PREPARATION OF HIGH AREAL WEIGHT FIBER SHELF-STABLE PREPREG OR MOLDING COMPOUND INTERMEDIATES

The present invention relates to storage stable thermosetting resin pre-impregnated or infused fiber materials or prepregs comprising fluid or liquid thermosetting epoxy resins and a hardener and/or a catalyst and on the surface of the fiber materials a latent, particulate curative or solid curative, such as dicyandiamide, and to methods for making them comprising (i) coating or sizing a fiber material and forming a layup of the fiber material having an areal weight, not counting the coating, of from 500 to 3000 $m^2/g$ which can be continuous or not continuous, for example, a fabric of a carbon fiber or other heat resistant fiber, or coating the layup of the fiber material and (ii) infusing it with a resin mixture of one or more liquid epoxy resins and a hardener or catalyst.

Fiber reinforced composites find application in a variety of structural and semi-structural applications, including wind energy; automotive components; aerospace structures; and recreational sporting goods. In structural applications, such as wind turbine blades, support of mechanical loads can require molded thicknesses of several inches. For example, a recently disclosed prepreg for use in wind turbine blades comprised fabrication of a 6 cm thick glass fiber structure utilizing 61 glass fiber prepreg layers. However, as the dry fiber areal weight (mass per unit area) increases, fiber infusion becomes more difficult, as decreasing permeability with increasing fiber areal weight presently limits the production of high areal weight fiber intermediates. To infuse resin into a dry fiber intermediate (e.g. continuous fiber fabric or chopped fiber mat) with increasing areal weight, the resin viscosity must decrease and/or the pressure drop must increase, per Darcy's law for fluid flow in a porous media. Further, the cost of such fiber prepreg layups could be greatly reduced if the areal weight of the fabric could be increased, for example, by using fewer layers of fiber.

Infusing dry fiber intermediates, such as a continuous woven or braided fabrics, discontinuous chopped fiber mats, or chopped fibers, can be enabled by lowering viscosity through increased resin temperature. However, the presence of resin hardeners and/or accelerating agents limits accessible temperature ranges (viscosities) for thermosetting resins. Furthermore, in prepregs requiring multi-day shelf stability, latent, particulate curatives are employed. To meet the shelf stability requirement for prepregs, a latent curing agent such as dicyandiamide (dicy) is particularly suitable and cost-effective. Dicy is heat activated and cures rapidly with epoxy resins at temperatures of >120° C. in the presence of a catalyst, to yield highly cross linked networks exhibiting high strength and excellent mechanical properties. However, dicy is a crystalline solid that is poorly soluble in epoxy resin; during infusion of a continuous fiber fabric, dicy particles are retained and filtered out by the fiber intermediates at the point of entry of the resin. Thus, the dicy is not uniformly distributed in the prepreg fiber matrix. Composites made using such prepregs will have under-cured regions, and suffer from a lack of homogeneity and poor mechanical properties.

Previously, one way to solve the problem of fiber mats filtering dicy out of a thermosetting resin prepreg involved micronizing the dicy to nano-sized particles. Such methods can be tedious and expensive.

An easier way to overcome the filtration problem was to dissolve dicy in a solvent so that the thermosetting resin mixture became homogenous during infusion. Conventional solvents have been used; however, the use of organic solvents pose several disadvantages such as toxicity issues, addition of volatile organic content to formulations, the added difficulty of solvent removal, and the negative consequences which solvent will have on properties of the resulting composite.

European Patent publication EP2905302 A1, Zhang et al. disclose the formation of carbon fiber composites whereby the thermoset resin hardener and/or accelerator is applied on the fiber prior to contact with the resin. Disclosed also are use of various additional sizing additives, such as film formers, lubricants, wetting agents, coupling agents, a solvent, and other compounds. The examples show that applying hardener/accelerator on the fiber such that the reduced hardener/accelerator concentration in the resin can improve the resin pot life. However, the Zhang reference is silent regarding high areal weight fiber substrates and regarding sizing compositions having latent, solid or particulate catalysts or hardeners.

The present inventors have sought to solve the problem providing shelf stable thermosetting resin prepregs or resin infused fiber materials containing dicyandiamide and having areal weights in excess of 500 $g/m^2$ and to enable the making of the fiber materials, as well as composites having excellent mechanical properties from the fiber materials.

STATEMENT OF THE INVENTION

1. In accordance with the present invention, thermosetting resin pre-impregnated or infused fiber materials or prepregs comprise a fiber material component of a heat resistant fiber, preferably, carbon fiber, having an areal weight of from 500 to 3,000 $g/m^2$, or, preferably, from 600 to 2,200 $g/m^2$, such as one containing a nonwoven mat, woven mat, or braid having a coating of from 0.5 to 4 phr, or, preferably, from 1 to 2.5 phr of a latent, particulate curative (catalyst or hardener) or solid curative, such as one chosen from guanidines, such as alkyl guanidines, aryl guanidines or dicyandiamide; aminoguanidines, including salts of aminoguanidine, such as aminoguanidine bicarbonate (AGB); aryl guanamines, such as benzoguanamine or phenylguanamine; organic-acid hydrazides, such as adipic dihydrazide and 4-isopropyl-2,5-dioxoimidazolidine-1,3-di(propionohydrazide); boron trifluoride-amine complexes; aromatic amines; imidazole; alkyl imidazoles, such as 2-methylimidazole; phenyl imidazoles; tertiary alkyl amines having a melting point above 30° C., or, preferably, above 40° C.; and tertiary aryl amines; preferably, dicyandiamide, wherein the prepregs are infused with a thermosetting resin mixture comprising (a) at least one liquid epoxy resin, and (b) a hardener, and/or a catalyst, preferably, dicyandiamide.

2. In accordance with the prepregs of the present invention as recited in item 1, above, wherein the ratio of amine hydrogen equivalents of the (b) total hardener, and/or catalyst to the epoxy group equivalents in the (a) at least one liquid epoxy resin ranges from 0.2:1 to 2.0:1 or, preferably, from 0.5:1 to 1.6:1, or even more preferably, from 0.7:1 to 1.1:1.

3. In accordance with the prepregs of the present invention as recited in any one of items 1 or 2, above, wherein the fiber material component comprises a continuous fiber woven, a continuous braided fabric, a discontinuous fiber mat or discontinuous chopped fibers, such as a bed or matrix of chopped fibers.

4. In accordance with the prepregs of the present invention as recited in any one of items 1, 2 or 3, above, wherein the (b) catalyst is chosen from an alkylaryl or phenyl substituted urea, for example, 3-phenyl-1,1-dimethylurea, 3-(3,4-dichlorophenyl)-1,1-dimethylurea) (DCMU), 3-(3-chloro-4-methylphenyl)-1,1-dimethylurea, toluene bis-dimethyl urea, and mixtures of any of the foregoing with dicyandiamide.

5. In accordance with the prepreg of the present invention as recited in any one of items 1, 2, 3 or 4, above, wherein the amount of the (b) catalyst or hardener, preferably, dicyandiamide, in the thermosetting resin mixture ranges from 1 to 20 phr, preferably from 1.5 to 15 phr, or even more preferably from 1.5 to 12 phr.

6. In accordance with the prepregs of the present invention as in any of items 1, 2, 3, 4, or 5, above, wherein the (a) at least one liquid epoxy resin comprises bisphenol A or F diglycidyl ether epoxy resins.

7. In accordance with the prepregs of the present invention as in any of items 1, 2, 3, 4, 5 or 6, above, wherein the (a) at least one liquid epoxy resin (neat) has a viscosity (ASTM D445, Kinematic viscosity, 2006) of from 500 to 15,000 mPa·s at 25° C. or, preferably, from 1000 to 11,000 mPa·s at 25° C.

8. In accordance with the prepregs of the present invention as recited in any of items 1, 2, 3, 4, 5, 6, or 7, above, wherein the coating on the fiber material component further comprises one or more of a film-forming thermoplastic resin, a wax, a surfactant, a lubricant, a coupling agent such as a hydrolysable silane, or mixtures thereof.

9. In accordance with the prepregs of the present invention as recited in any previous item, above, wherein after curing for 2 minutes at 150° C., or after for 3 minutes at 150° C., the resulting material has a cured Tg (DSC) of 150° C. or greater.

10. In another aspect of the present invention, methods of making thermosetting resin pre-impregnated or infused fiber materials or prepregs comprise (i), in any order, forming a layup of a fiber material by wrapping, winding, collecting or amassing a fiber material component of a heat resistant fiber, preferably, carbon fiber, having an areal weight of from 500 to 3,000 g/m$^2$, or, preferably, from 600 to 2,200 g/m$^2$, such as one containing a nonwoven mat, woven mat, or braid, coating or sizing the fiber material component with an aqueous solution, solvent (e.g. dimethyl formamide) solution, or aqueous dispersion of from 0.5 to 4 phr, or, preferably, from 1 to 2.5 phr of a latent, particulate curative (catalyst or hardener) or solid curative, such as one chosen from guanidines, such as alkyl guanidines, aryl guanidines or dicyandiamide; aminoguanidines, including salts of aminoguanidine, such as aminoguanidine bicarbonate (AGB); aryl guanamines, such as benzoguanamine or phenylguanamine; organic-acid hydrazides, such as adipic dihydrazide and 4-isopropyl-2,5-dioxoimidazolidine-1,3-di(propionohydrazide); boron trifluoride-amine complexes; aromatic amines; imidazole; alkyl imidazoles, such as 2-methylimidazole; phenyl imidazoles; and tertiary aryl amines; preferably, dicyandiamide, and then (ii) drying the coating or allowing the coating to dry and then infusing the prepreg with a thermosetting resin mixture comprising (a) at least one liquid epoxy resin, and (b) dicyandiamide and/or a catalyst.

11. In accordance with the methods of making the prepregs of the present invention as recited in item 10, above, wherein the latent, particulate curative or solid curative in the coating or sizing, preferably, dicyandiamide, comprises an aqueous solution or an aqueous dispersion of the latent, particulate curative or solid curative further comprising one or more surfactant, such as a nonionic surfactant.

12. In accordance with the methods of making prepregs of the present invention as recited in any one of items 10 or 11, above, wherein the coating or sizing comprises spraying, dipping, or curtain coating the fiber material component, followed by drying the coating or size or allowing it to dry.

13. In accordance with the methods of the present invention for making prepregs as recited in any one of items 10, 11, or 12, above, further comprising compression molding one or more prepregs to make a cured composite material.

Unless otherwise indicated, conditions of temperature and pressure are ambient temperature and standard pressure.

Room temperature means a temperature of from 22-23° C.

All ranges recited are inclusive and combinable.

Unless otherwise indicated, any term containing parentheses refers, alternatively, to the whole term as if no parentheses were present and the term without them, and combinations of each alternative. Thus, the term "(poly) alkoxy" refers to alkoxy, polyalkoxy, or mixtures thereof.

Unless otherwise indicated, all materials are used neat, without solvents, diluents or carriers and contain a total of less than 0.2 wt. % of impurities.

All ranges are inclusive and combinable. For example, the term "a range of 50 to 3000 cPs, or 100 or more cPs" would include each of 50 to 100 cPs, 50 to 3000 cPs and 100 to 3000 cPs.

As used herein, unless otherwise indicated, the term "amine hydrogen equivalent weight" or ANEW means the amount in grams of an amine that yields one molar equivalent of hydrogen in reaction as measured by titration using ASTM D 2074-07 (2007).

As used herein, the term "ASTM" refers to the publications of ASTM International, West Conshohocken, Pa.

As used herein, the term "areal weight" means the weight in grams of a given fiber material or layup per one meter square area of the material without regard for its thickness. Thus, materials made with more layers of a given fiber will have a higher areal weight even though the fiber has one density or weight per unit volume.

As used herein, the term "composite" means a cured material containing a matrix of one or more thermosetting resins and dispersed in the matrix one or more heat resistant fiber compositions.

As used herein, the term "curative" means catalyst or hardener for epoxy resins.

As used herein, the term "DSC" refers to differential scanning calorimetry as set forth in the Examples, below. The term "Cured Tg" refers to the DSC result of a single DSC scan of an already cured resin material, which DSC scan is performed in the manner of the first scan as set forth in the examples, below.

As used herein, the term "EEW" or "epoxy equivalent weight" means the amount determined using a Metrohm 801 Robotic USB sample processor XL and two 800 Dosino™ dosing devices for the reagents (Metrohm USA, Tampa, Fla.). The reagents used are perchloric acid in acetic acid 0.10 N and tetraethylammonium bromide. The electrode for the analysis is an 854 Iconnect™ electrode (Metrohm). For each sample, 1 g of dispersion is weighed out into a plastic sample cup. Then 30 mL of THF (tetrahydrofuran) is first added and mixed for 1 minute (min) to break the shell on the dispersion. Next, 32 mL of glacial acetic acid is added and mixed for another 1 min to fully dissolve the sample. The sample is then placed on the auto sampler and all relevant data (e.g., sample ID, sample weight) is added to the software. From here the start button is clicked to start the titration. Thereafter, 15 mL of tetraethylammonium bromide is added, and then the perchloric acid is slowly added until a potentiometric endpoint is reached. Once the potentiometric endpoint is reached, the software calculates an EEW value based on the amount of sample and perchloric acid used. In a mixture of epoxy resins, the EEW is a weight average of the EEWs for each epoxy resin in the mixture. For example, a 50/50 (w/w) mixture of an epoxy resin having an EEW of 500 and one having an EEW of 200 is 350.

As used herein, the term "latent curative" means a curative that is insoluble in epoxy resin at room temperature and, as indicated by Integrated Heat Flow (DSC), does not react with or cure epoxy resins at temperatures of 25° C. in less than 7 days.

As used herein, the term "particulate curative" or "solid curative" refers to hardeners or catalysts which comprise a solid, gel or amorphous particle at room temperature and which remain particles and do not flow at storage temperatures below 30° C.

As used herein, the term "phr" means per hundred weight parts resin.

As used herein, the term "solid" refers to the state of a given material below its glass transition temperature at which the material does not flow.

As used herein, unless otherwise indicated, the term "solids content" refers to the total weight of epoxy resins, hardeners, catalysts or accelerators, and other non-volatile materials, such as pigments, silicones and non-volatile additives that remain after cure of a given composition, expressed as a total wt. % of the composition, regardless of their state as liquids, gases or solids. Solids exclude solvents, such as xylene, and non-reactive diluents, such as, for example, plasticizers like butyl adipates.

As used herein, the term "shelf life" refers to the time during which a prepreg stored at ambient temperature and pressure retains a DSC Tg of 40° C. or less.

As used herein, the term "thermosetting" means a resin containing material that cures or crosslinks upon exposure to heat; and the term "thermoset" refers to a heat cured or crosslinked resin containing material.

As used herein, the abbreviation "wt. %" stands for weight percent.

The present inventors have discovered that in resin infused fiber materials or prepreg materials containing a latent, particulate curative, such as dicyandiamide (dicy), the filtration problems associated with the curative, especially dicy, getting caught in the layers or lamina or high areal weight fiber material components can be avoided by simply including some dicy as a particulate on the fiber material component itself. The inventors found a variation in the carbon fiber fabric architecture due to the differences in the geometry of the carbon fiber. For example, whereas an unsized carbon fiber tow forms a well-consolidated "tape-like" tow that is flat; by contrast, a dicy coated carbon fiber material was more circular in cross-section and therefore had a narrower tow width compared to the unsized carbon fiber tows. In the same example, more wraps were needed for the dicy coated fiber to cover the cardboard frame completely, as compared to the uncatalyzed fibers. Furthermore, the latent, particulate curative coated fabrics tended to have "gaps" or "splits" in the fabrics, unlike the unsized carbon fiber tow. Accordingly, "splits" and "gaps" in the fabric form high permeability pathways for resin, leading to reduced filtration of the curative out of the thermosetting resin mixture and enhanced reactivity for catalyzed fibers.

The prepregs of the present invention can be combined with the epoxy resin to yield a room temperature stable intermediate but which cures rapidly at elevated temperatures (e.g. 150° C.). The high areal weight, greater than 500 g/m$^2$, dry fiber intermediates can be combined with resin to form prepregs and sheet and bulk molding compounds suitable for high temperature (e.g. >100° C.) molding, for accelerated cure kinetics relative to neat resin due to more uniform distribution of resin catalyst, yielding rapid, high temperature molding.

Because the coating or sizing of the latent, particulate curative, such as dicy, on the fiber material component improves resin flow through infusion, such as vacuum infusion, separately, one or more catalyst and/or an accelerator could be introduced into the prepreg via epoxy resin infusion. The result will be higher catalyst or hardener concentrations in the thermosetting resin mixture, more uniform distribution of catalyst or accelerator in the resin mixture, or both.

The present invention enables one to provide a prepreg or infused fiber material for use in automotive applications having a cured glass transition temperature (Cured Tg) higher than the cure temperature when cured for 2 minutes at ~150° C., or after for 3 minutes at 150° C., while avoiding gelation of the matrix resin in the formation and storage of the prepreg. A Cured Tg of >150° C. allows a part compression molded at around 150° C. to be released while still hot without warping. The resulting parts also have improved heat resistance, less creep and dimensional stability at the temperatures used for automobile manufacture and operation. To satisfy the need for the high cured Tg, more curative, such as dicy, is needed in composites made from prepregs or infused fiber materials containing dicy than are disclosed in the art, while avoiding the dicy filtration problem found in the art.

The prepreg materials of the present invention can comprise one or more hardeners or catalysts (ii)(b) that react when the prepreg materials are cured to form a composite article. Suitable catalysts are additional dicy, substituted ureas, like toluene bis-dimethyl urea (TBDMU).

In the resin infused fiber materials or prepreg materials of the present invention, the (a) liquid epoxy resins can be any compound or mixture of compounds which contains, on average, more than one epoxy moiety per molecule, or a mixture of such epoxy resin compounds, and which have the desired viscosity or which are liquid at infusing temperatures. Suitable polyepoxides (polyglycidyl ethers of a polyol, such as, for example, a polynuclear phenol) may be prepared by reacting an epihalohydrin with an aromatic polyol, polynuclear phenol, aliphatic polyol, or a halogenated polyol. The preparation of such compounds is well known in the art. See Kirk-Othmer Encyclopedia of Chemical Technology 3rd Ed. Vol. 9 pp 267-289 (incorporated herein by reference).

Preferred polyols for making epoxy resins are the bisphenols and other polynuclear phenols, as well as polyalkylene glycols.

Examples of suitable epoxy resins for use in the thermosetting resin mixture of the present invention may comprise conventional epoxy resins which have the desired viscosity or are liquid at infusing temperatures, such as bisphenol A or F epoxy resins, phenolic epoxy resins, polyphenolic epoxy resins, novolac epoxy resins and cresol epoxy resins having an epoxy equivalent weight (EEW) of 250 or below, as well as mixtures thereof, for example, mixtures of bisphenol epoxy resins and novolac epoxy resins.

Suitable epoxy resins for making the thermosetting resin mixture of the present invention may include any conventional liquid or semi-solid epoxy resins having an EEW below 500, or, preferably, below 250. Such suitable epoxy resins may be chosen from, for example, bisphenol A or F epoxy resins, phenolic epoxy resins, polyphenolic epoxy resins, novolac epoxy resins, oxazolidone containing epoxy resins and cresol epoxy resins, as well as mixtures thereof, for example, mixtures of bisphenol epoxy resins and novolac epoxy resins.

Preferably, the epoxy resins of the present invention are linear or difunctional glycidyl ethers of polyols, chosen from epoxy resins having an epoxy equivalent weight (EEW) of from 150 to 500 or, preferably, below 250.

The thermosetting resin mixture compositions of the present invention can be present as solutions that include up to 30 wt. % diluent, preferably, to aid in resin flowability, up to 20 wt. %, or 1 wt. % or more where the diluent is a reactive diluent. Suitable reactive diluents may include, for example, cresol glycidyl ether, butyl glycidyl ether and C12-C14 aliphatic glycidyl ether, and diglycidyl ethers such butanediol diglycidyl ether, hexanediol diglycidyl ether, cyclohexanedimethanol diglycidyl ether, and triglycidyl ethers such as trimethylolpropane triglycidyl ether and glycerol triglycidyl ether.

The coating or size on the fiber material component of the present invention can be formed in any conventional manner and is preferably formed from an aqueous solution of a curative chosen from dicyandiamide, 2-methylimidazole and 4-isopropyl-2,5-dioxoimidazolidine-1,3-di(propionohydrazide). Preferably, the coating comprises one or more surfactants. After applying, the coating is allowed to dry.

The coating or size can comprise a surfactant containing dispersion of the latent, particulate curative, i.e. a dispersion of insoluble particulates.

Coating or size dispersions can be formed in water or organic solvents and can contain a surfactant or a dispersant, e.g. salts of polyacrylic acid.

The coating or size is applied to the fiber or the fiber layup without dissolution on the fiber surface, thereby maintaining control over the latent curative particle size on the fiber surface.

The coating or size, when allowed to dry or dried by heating up to 160° C. for a period of from 40 seconds to 3 minutes on the fiber material component leaves finely divided particles of the latent, particulate curative, e.g. dicyandiamide, on the fiber material.

In accordance with the methods of the present invention, the coating or sizing of the fiber material can comprise the coating or sizing the fiber and drying the coating or size, followed by forming the layup by weaving, braiding, stitching etc. a high areal weight fabric intermediate and then infusion, or by forming the layup or textile of the fiber material and then applying the coating or size to the layup and drying the coating or size, followed by resin infusion, e.g. as in prepregging. Thus, the coating or sizing and the forming of a layup can take place in any order.

Prepregs and composites made from prepregs made in accordance with the invention may have fiber contents of at least 50 wt. %, and up to 90 wt. %, preferably 60 wt % and up to 75 wt %.

Suitable heat resistant fibers for use in the resin infused fiber materials or prepreg materials of the present invention are those fibers that are thermally stable and have a melting temperature such that the reinforcing fibers do not degrade or melt during the curing process. Suitable fiber materials include, for example, carbon, glass, quartz, polyaramid, boron, carbon, wheat straw, hemp, sisal, cotton, bamboo and gel-spun polyethylene fibers.

Because of the high areal weight of the fiber material component, infusion of the thermosetting resin mixture comprises flowing the mixture into and around multiple layers or strands of the fiber material component. Resin infusion methods may be any conventional methods wherein the thermosetting resin matrix becomes fluid. Suitable infusion methods comprise spraying, pouring or, preferably, drawing a thermosetting resin mixture onto a fiber material component by contacting the thermosetting resin mixture on one or more carrier sheets with the fiber material, such as a fiber material layup, mat, or collection of fibers, to form a thermosetting resin fiber material mass.

In accordance with the methods of making prepreg materials of the present invention, infusing a thermosetting resin mixture comprises flowing the thermosetting resin mixture into the fiber materials of the present invention. Infusing to flow a fluid resin mixture and wet out the fiber materials generally takes from 5 to 60 minutes, and may be followed by B-staging.

The resin infused fiber materials or prepreg materials of the present invention may further comprise one or more impact modifiers or tougheners, reactive diluents, coalescents, pigments; tackifiers, antioxidants or wetting agents, preferably, internal mold release agents.

The thermosetting resin mixture of the present invention may contain an internal mold release agent. Such an internal mold release agent may constitute up to 5 wt. %, or, preferably, up to 3.5 wt. % of the total thermosetting resin mixture. Suitable internal mold release agents are well known and commercially available, including fatty acids, fatty acid esters, fatty acid salts, long chain acrylates, amide waxes, and mixtures of fatty acids, amines and esters. Waxes such as zinc stearate, stearyl acrylate and Montan acid esters are particularly suitable. With regard to the montanic acid esters, montanic acid esterification products obtained by subjecting montanic acid and diol compounds, such as ethylene glycol and butylene glycol, or triol compounds such as glycerin, to a dehydration condensation reaction are preferred. These are commercially available as LICOWAX E and LICOLUB WE4 (Clariant International AG, Muttenz, CH).

Composites in accordance with the present invention may be formed by introducing the resin infused fiber materials or prepreg materials into a compression mold and curing.

In compression molding in accordance with the present invention, one or more resin infused fiber materials or prepreg materials is arranged around a male mold or pattern and is introduced into a female mold or open mold or is arranged within a female mold or pattern, followed by closing the open mold or female mold. The mold may be preheated. The curing temperature may be, for example, from 60 to 180° C., for example, from 80 to 160° C., or, preferably 100 to 160° C., or especially preferably, 130 to 160° C.

Suitable compression molding pressures range from 6,000 to 30,000 kPa (60 to 300 bar) or, preferably, from 10,000 to 20,000 kPa.

Preferably, curing is continued for from 120 to 600 seconds or less, or, preferably, from 120 to 360 seconds or less, or, more preferably, 240 seconds or less.

Any mold surface may be treated with an external mold release agent, which may contain solvent or water.

The resin infused fiber materials or prepreg materials, including any male pattern or mold, may be enclosed in a bag or film such as is commonly used in vacuum assisted compressing molding processes.

The methods of the present invention can be used to make a wide variety of composite products where fiber reinforced plastics appear, including various types of automotive or other transportation parts, housings for appliances and electronics goods, and sporting goods, such as tennis rackets.

EXAMPLES

The following examples are used to illustrate the present invention without limiting it to those examples. Unless otherwise indicated, all temperatures are ambient temperatures and all pressures are 101 kPa (1 atmosphere).

The following abbreviations, materials and chemicals were used in the Examples that follow:

NCF: Non Crimp Fabric of carbon fiber.

TABLE 1

Formulation ingredients

| Name | Description |
|---|---|
| Epoxy Resin 1 | Liquid epoxy resin of a diglycidyl ether of Bisphenol A (EEW 176-182 g) |
| Epoxy Resin 2 | Liquid epoxy resin of a diglycidyl ether of Bisphenol A (EEW 175-181 g) |
| Dicyandiamide or Dicy | Technicure ™ nano Dicy (A&C Catalysts Linden, NJ, AHEW 21 g) |
| Unsized carbon fiber or A42 | A42 (12k) Unsized carbon fiber (DowAksa, Yalova, Turkey). After a conventional carbon fiber graphitization process, the carbon fiber was treated with a basic electrolyte to provide surface oxidation. |
| A42 D012 | A42 (12k) sized carbon fiber (DowAksa, Yalova, Turkey) supplied with an epoxy sizing agent at 1.0-2.2 wt. %, total weight dry weight of sized fiber |

Examples A, B and C: Formation of Thermosetting Resin Formulations

Each mixture was prepared first by weighing the amounts of materials indicated in one of the three Formulations given in Table 2, below, into a SpeedMixer™ cup. The cup was then inserted into a dual asymmetric centrifugal FlackTek SpeedMixer™ (FlackTek Inc., Landrum, S.C.) and the contents were mixed for 1-2 minutes at 3,000 rpm.

TABLE 2

Resin Formulations

| Materials | Formulation A | | Formulation B | | Formulation C | |
|---|---|---|---|---|---|---|
| | PHR | Total wt. % | PHR | Total wt. % | PHR | Total wt. % |
| Epoxy Resin 2 | 65 | 65.00% | 65 | 63.73% | 65 | 60.13% |
| Epoxy Resin 1 | 35 | 35.00% | 35 | 34.31% | 35 | 32.38% |
| Dicy | 0 | 0.00% | 2 | 1.96% | 8.1 | 7.49% |

Three different carbon fiber materials were used in the examples that follow. These carbon fiber are summarized in Table 3, below.

TABLE 3

Carbon Fiber

| Fiber Material | Carbon Fiber | Sizing |
|---|---|---|
| F1 | A42 | None |
| F2 | A42 | Dicy |
| F3 | A42 D012 | D01 |

Dicy-sized carbon fiber: Dicyandiamide (Dicy) solutions were prepared by adding 3 wt. % of the Dicy curative to room temperature deionized water. The Dicy was fully dissolved. Using a continuous process, unsized carbon fiber was pulled by a 5 roller feed Godet set roller unit (model FR-N0.6-SRV, Izumi International, Inc. Greenville, S.C.) from the creel stand and then fed through a bath of a prepared, room temperature (~20° C.), aqueous dicy sizing solution with 3 wt % Dicy solids. The sizing application time was 10 seconds. The sized carbon fiber tow was pulled by a tension controlled winder from the sizing bath through the dryer, maintained between 136 to 163° C. via a controller, at a line speed of 1 m/min, for a total drying time of 128 sec to remove the water and produce sized carbon fiber. The dried carbon fiber tow is collected on the spool of the winder. The fiber tension was monitored between the dryer and the winder, using a hand held tension meter (ELECTROMATIC DTMB-1 K, Electromatic Equipment Co., INC), and found at the winder to be 300-600 g. The sizing level of the sized fiber in this example was 1.4-1.5 wt. % dicy, as determined by a hot water extraction method.

Determination of Sizing Level on Dicy-Sized Carbon Fiber: Dicy-sized fiber samples were chopped to ~4-inch lengths with ceramic-bladed scissors. A clean, numbered quartz crucible was weighed (recorded) and then tared. Approximately 1.5 g (±0.2 g) of fiber was weighed into the numbered crucible and the weight was recorded. The fiber was removed from the crucible and placed into a 2-oz glass wide-mouth jar with a polyseal cap. 30 mL of deionized (Milli-Q deionized water, Millipore, Corp) water, pre-heated to 90° C. in an oven, was added to the jar and sealed. The sample was shaken for 15 minutes on a flatbed shaker to extract the Dicy from the fiber into the water. The water was decanted from the fiber. Two additional extractions were conducted, each with 30 mL of hot water, 15 min shaking, and decanting to recover the fiber. The fiber (with the majority of the water removed) was transferred back into the numbered crucible where it was initially weighed. The samples were placed onto a glass petri dish and then into a laboratory furnace (Fisher Scientific Furnace Model 495A) which had been purged with nitrogen for at least 30 minutes. The sample was heated to 150° C. over approximately 30 minutes, held at 150° C. for 30 minutes, then cooled (while still under nitrogen purge). The furnace temperature program required ~4 hours to complete. After reaching ~40° C., the samples remained in the oven under nitrogen purge to reach room temperature (23° C.). Finally, the remaining material (dried, de-sized fiber) and crucible were weighed to get the final fiber+crucible weight. Sizing content was calculated using the following equations:

Residue weight=(Final weight, fiber residue and crucible)−(Initial crucible weight+Initial fiber weight)

Sizing level (Wt %)=(Residue weight (g)/Initial fiber weight (g))×100

Carbon Fiber Fabric: To prepare a high areal weight (>600 $gm^{-2}$) carbon fiber fabric, two 10.24×10.24 cm (4"×4")

pieces of polytetratfluoroethylene release liner were cut and a double-sided adhesive film was prepared by slightly overlapping layers of double-sided tape (1.28 cm (½")) wide Scotch™ Double Sided Tape, 3M, Minneapolis, Minn.) over the Teflon sheet. After laying up the adhesive film, a 5.12 cm (2") diameter hole was punched in the center of the Teflon release liner and the adhesive film. Thereafter, a frame was constructed of a 10.24 cm×10.24 cm (4"×4") cardboard piece cut with a 6.4 cm×6.4 cm (2.5"×2.5") square cut in the middle. The double sided adhesive tape was applied to both sides of the frame. The carbon fiber (Table 3) was wrapped continuously in the [0°] direction around the cardboard frame (between 11-23 wraps per side); then, a film of the double sided adhesive tape was applied on the carbon fiber wrap, except for a 5.12 cm (2") diameter hole in the middle. A second layer of carbon fiber was wrapped continuously in the [90°] direction around the cardboard frame (between 11-23 wraps per side) and the double sided adhesive tape film was applied on the carbon fiber wrap, except for the 5.12 cm (2") diameter hole in the middle. A third layer of carbon fiber was wrapped continuously in the [0°] direction around the cardboard frame (between 11-23 wraps per side) and the adhesive film was applied on the carbon fiber wrap as in with the first and second carbon fiber layers. The fourth layer of carbon fiber was wrapped continuously in the [90°] direction and an adhesive film was applied thereto in the same manner as the second layer of carbon fiber. An adhesive film was prepared on each of two polytetrafluoroethylene release liners and a 2.56 cm (1") diameter hole was punched in the center. The two release liners were placed, respectively, to the top and the bottom of the carbon fiber fabric, with the polytetrafluoroethylene exposed to the outside of the resulting stack. Then, four holes were punched, one in each corner of the fabric/cardboard assembly so that it could be sandwiched between the flanges if a resin infusion cell. At the conclusion of the fiber preparation, a >600 g/m² non-crimp fabric (NCF) having an eight layer 0°/90°/0°/90°/90°/0°/90°/0° layup structure was created. The first layer is considered "layer 1" and each successive lower layer is consecutively numbered so that eight layers are provided with the bottom layer in the layup considered "layer 8".

The use of the adhesive layer between each carbon fiber plies insured that the structure could be readily handled and that each layer could be easily separated from the next. Punching a 5.12 cm (2") diameter hole in the adhesive layer ensured that there was an unobstructed central area of the layup through which the resin can percolate. The layup was placed in an infusion cell.

Infusion: Infusion was performed in a specially built resin infusion cell constructed with a resin reservoir consisting of a capped threaded pipe reservoir attached to a female flange and placed in contact with the carbon fiber fabric, with the outlet exposed to a vacuum. On the outlet side, an additional flange was used with the threaded pipe connected to vacuum. Between the two flange assemblies, a sandwich structure was constructed with rubber gaskets to insure releasability of the resin-infused carbon fiber fabric following infusion. On each of the top and bottom of the sandwich structure sat a large rubber gasket with a 3.84 cm (1.5") diameter hole; a second rubber gasket with 0.64 cm (0.25") diameter hole concentric with the hole in the large rubber gasket was placed just below the top large rubber gasket and just above the bottom rubber gasket; just below the top second rubber gasket and just above the bottom second rubber gasket sat a rubber O-ring, 1.92 cm (0.75") ID and 2.56 cm (1") OD with the "O" placed concentric with the holes in the large rubber gaskets and the second rubber gaskets. Sandwiched between the two rubber O-rings sat the indicated carbon fiber fabric which, along with all gaskets and O-rings, forms a sandwich structure bolted between the flanges with 4 bolts. The bolts were tightened to compress the carbon fiber layup in the resin infusion cell such that a vacuum seal was achieved. With the resin infusion cell assembled, but before resin was added to the reservoir of the cell, creation of a vacuum seal was verified (driving force for infusion was the 101 kPa of pressure generated by the vacuum pump) by temporarily connecting the resin infusion cell to a vacuum knock-out pot and a vacuum pump. The resin infusion cell was then disconnected from the vacuum pump and then placed inside an oven and clamped securely (e.g. with a ring stand) into place. The resin infusion cell and resin formulation were then preheated to an operating temperature of 50° C. Once the resin and infusion cell were preheated, the cell was removed from the oven and 40-100 g of the indicated thermosetting resin mixture was loaded into the resin infusion cell. The top of the secondary container loaded cell was closed and the cell was put back into the oven and the cell was connected at its bottom to a vacuum line using a hose fitting and a hose clamp. The vacuum line was connected to a knock-out pot located outside of oven equipped with a removable plastic liner to catch any excess resin that flows through the cell bottom and then started. The infusion cell assembly was heated for an additional 30 minutes at 50° C. and then the vacuum was turned on. When the resin entered the outlet vacuum line, the experiment was stopped.

Dissecting the cured carbon fiber material for testing: Once the resin infusion is complete, the resin infusion cell was disassembled so as to avoid disturbing carbon fiber fabric and the center part of the resulting carbon fiber layup was punched out with a 2.56 cm (1") diameter steel punch and hammer. Using forceps, the uncured fiber/resin mixture was the dissected layer by layer into the following layers: 1+2 (0°/90°); 3 (0°); 4+5 (90°/90°); 6 (0°); 7 (90°); and 8 (0°). Materials from selected plies were characterized for reactivity using differential scanning calorimetry.

Top, Middle and Bottom Layers: In the Examples below, the top layer of the eight layer fiber materials is considered layers 1 and 2, the middle layers are considered layers 4, 5 and 6 and the bottom layers are considered layer 8. Layer 1 sat on top of the fiber material in the infusion cell and layer 8 sat on the bottom. Characterization of epoxy-infused fabric: Test Methods performed on the infused carbon fiber layup included the following:

Differential Scanning Calorimetry (DSC): A ~10 mg sample from the indicated material layers was placed within a sealed DSC pan and heat flow was measured in a scan running from 20° C. to 250° C. at a ramp rate of 10° C./min. Reactivity of each material was quantified by integrating for the total heat of reaction. An increase in heat flow indicates enhanced reactivity.

Integrated Heat Flow (J/g): Represents the integrated area under the line in a chart of heat flow (Watts/gram, W/g) versus temperature (x-axis), as obtained under a temperature ramp from 20° C. to 250° C. at a ramp rate of 10° C./min. In the DSC scan, reactivity of each material was quantified by integrating for the total heat of reaction, normalized by total DSC sample mass.

The DSC results are presented below in Table 4, below.

Estimated Areal Weight: Assuming a value of 0.8 g/m for carbon fiber tow linear density, the carbon fiber fabric areal weight was estimated as corresponding to the number of wraps required to cover the cardboard frame in the resin infusion cell. Where the number of wraps per ply was as low as 11 for fiber material F3 fabrics, an equivalent areal weight was 692 g/m², and; where the number of wraps was as high as 23 for fiber material F2 (the 1.4-1.5 wt. % dicy sized fiber), an equivalent areal weight was 1449 g/m². The presence of the dicyandiamide on the fiber enabled some variation in the carbon fiber fabric architecture due to the differences in the geometry of the carbon fiber tows. For example, Fibers F1 and F3 were well-consolidated "tape-like" tows that were flat and required the fewest number of wraps to completely cover the cardboard frame of the fiber layup. By contrast, fiber material F2 (a 1.4-1.5 wt. % dicy coated carbon fiber) was more circular in cross-section and therefore had a narrower tow width compared to the F1 and F3 carbon fiber tows. More wraps were needed for the F2 1.4-1.5 wt. % dicy coated fiber to cover the cardboard frame completely, as compared to the uncatalyzed fibers F1 and F3. Furthermore, the fabrics for fiber material F2 (a 1.4-1.5 wt. % dicy coated carbon fiber) in Examples 4 and 5 tended to have "gaps" or "splits" in the fabrics, unlike the catalyst free fiber materials F1 and F3 in Comparative Examples 1, 2, and 3.

TABLE 4

Summary of DSC analysis of experiments

| New Example Number | Fiber | Resin | n | DSC Heat Flow (J/g) | | |
|---|---|---|---|---|---|---|
| | | | | Top Layers | Middle Layers | Bottom Layer |
| 1* | F3 | B | 1 | 124.4 | 76.93 | 14.71 |
| 2* | F3 | C | 1 | 186.3 | 0.193 | negligible† |
| 3* | F1 | C | 2 | 145.3 | 16.52 | 8.995 |
| 4 | F2 | C | 2 | 178.25 | 111.25 | 42.45 |
| 5* | F2 | A | 1 | 14.69 | 5.5585 | 0.4466 |

*Indicates Comparative Example;
†While no mass was recorded for bottom layer of comparative example 2*, preventing a direct (mass normalized) comparison to Top and Middle layers in Example 2, the total heat flow was negligible;
n: number of experiments conducted***

As shown in Table 4, above, pronounced dicy filtration occurs for carbon fiber fabrics infused with both 2 and 8.1 phr dicy resins in Comparative Examples 1, 2 and 3. Further, in those Comparative Examples, the integrated heat flow measure fell dramatically after middle layers (Formulation B, C.Ex .1) of the carbon fiber layup made with an epoxy resin formulation with 2 phr of dicy and after the first two layers (Formulation C, C. Ex 2 and 3) of the carbon fiber layup made with an epoxy resin formulation with 8.1 phr of dicy. Filtering was visually observed on the top part of the fabric layup, where the fabric was in direct contact with the resin reservoir. a thick resin film, milky in appearance was observed on the top part of the fabric layup; whereas, on the bottom of the fabric layup only resin that was clear in appearance was observed, consistent with the color of the liquid epoxy resin mixture without dicy (e.g. Formulation A). No catalytic activity was observed where dicy was only applied onto the fabric and the epoxy resin contained no curative or catalyst, as in Comparative Example 5. In the inventive Example 4 where dicy was applied onto the fabric and the epoxy resin contained a curative or catalyst, filtration was reduced dramatically and reactivity was observed in the top, middle, and bottom layers of the fabric layup. For the 1.4-1.5 wt. % dicy-coated fiber infused with the 8.1 phr dicy resin (Formulation C) in Example 4, dicy filtration was mitigated and improved heat flow did not fall nearly as far in layer 8 as it did in layer 8 of Comparative Examples 2 and 3. A measurable integrated heat flow was observed in the first DSC scan even in the last layer of the carbon fiber fabric in inventive Example 4.

We claim:

1. A prepreg comprising a fiber material component of a heat resistant fiber having an areal weight of from 500 to 3,000 g/m² having a coating of from 0.5 to 4 phr of a latent, particulate curative or solid curative, wherein the coated fiber material component is infused with a thermosetting resin mixture comprising (a) at least one liquid epoxy resin, wherein the (a) at least one liquid epoxy resin comprises bisphenol F diglycidyl ether epoxy resin, and (b) a hardener and/or a catalyst, wherein the amount of the (b) hardener and/or catalyst in the thermosetting resin mixture ranges from 1.5 to 12 phr.

2. The prepreg as claimed in claim 1, wherein the fiber material component is carbon fiber.

3. The prepreg as claimed in claim 1, wherein the fiber material component has an areal weight of from 600 to 2,200 g/m².

4. The prepreg as claimed in claim 1, wherein the fiber material component comprises a continuous fiber woven, a continuous braided fabric, a discontinuous fiber mat or discontinuous chopped fibers.

5. The prepreg as claimed in claim 1, wherein the latent, particulate curative is chosen from guanidines, alkyl guanidines, aryl guanidines, aminoguanidines, salts of aminoguanidine, aryl guanamines, organic-acid hydrazides, boron trifluoride-amine complexes, aromatic amines, imidazole, alkyl imidazoles, tertiary alkyl amines having a melting point above 30° C., and tertiary aryl amines.

6. The prepreg as claimed in claim 5, wherein the latent, particulate curative is a guanidine which is dicyandiamide.

7. The prepreg as claimed in claim 1, wherein the (a) at least one liquid epoxy resin (neat) has a viscosity (ASTM D445, Kinematic viscosity, 2006) of from 500 to 15,000 mPa·s at 25° C.

8. A method of making a prepreg comprising (i) in any order, forming a layup of a fiber material by wrapping, winding, collecting or amassing a fiber material component of a heat resistant fiber having an areal weight of from 500 to 3,000 g/m², coating or sizing the fiber material component with an aqueous solution, solvent solution, or aqueous dispersion of from 0.5 to 4 phr of a latent, particulate curative or solid curative and then (ii) drying the coating or sizing or allowing the coating or sizing to dry and then infusing the coated or sized fiber material component with a thermosetting resin mixture comprising (a) at least one liquid epoxy resin, wherein the (a) at least one liquid epoxy resin comprises bisphenol F diglycidyl ether epoxy resin, and (b) dicyandiamide and/or a catalyst, wherein the amount of the (b) dicyandiamide and/or catalyst in the thermosetting resin mixture ranges from 1.5 to 12 phr.

* * * * *